United States Patent [19]

De Villiers et al.

[11] Patent Number: 5,403,367
[45] Date of Patent: Apr. 4, 1995

[54] FILTRATION

[75] Inventors: Pierre De Villiers, Hartbeespoort; Willem J. C. Prinsloo, Pretoria; Ivor M. Minnaar, Broederstroom, all of South Africa

[73] Assignees: Atomic Energy Corporation of South Africa Limited; Universal Filtration (Proprietary) Limited, both of South Africa

[21] Appl. No.: 22,339

[22] Filed: Feb. 24, 1993

[30] Foreign Application Priority Data

Feb. 27, 1992 [ZA] South Africa ............... 92/1472

[51] Int. Cl.$^6$ .......................................... B01D 50/00
[52] U.S. Cl. ........................................ 55/320; 55/337
[58] Field of Search ............... 55/320, 322, 323, 327, 55/332, 337, 489

[56] References Cited

U.S. PATENT DOCUMENTS

| | | |
|---|---|---|
| 3,695,007 | 10/1972 | Farnworth . |
| 3,864,107 | 2/1975 | Baigas, Jr. . |
| 4,093,437 | 6/1978 | Ichihara et al. ............... 55/487 |
| 4,126,560 | 11/1975 | Marcus et al. ............... 210/489 |
| 4,158,449 | 6/1979 | Sun et al. ............... 244/136 |
| 4,162,905 | 7/1979 | Schuler ............... 55/337 |
| 4,204,848 | 5/1980 | Schulmeister et al. ............... 55/269 |
| 4,205,971 | 6/1980 | Abthoff et al. ............... 55/330 |
| 4,247,313 | 1/1981 | Perry, Jr. et al. ............... 55/302 |
| 4,248,613 | 2/1981 | Linhart ............... 55/394 |
| 4,277,263 | 7/1981 | Bergeron ............... 55/282 |
| 4,514,193 | 4/1985 | Booth ............... 55/290 |
| 4,946,483 | 8/1990 | Coral ............... 55/323 |
| 4,971,603 | 11/1990 | Prinsloo et al. . |
| 4,976,748 | 12/1990 | Prinsloo et al. . |
| 4,985,058 | 1/1991 | Prinsloo et al. . |

FOREIGN PATENT DOCUMENTS

| | | |
|---|---|---|
| 0214374 | 3/1987 | European Pat. Off. . |
| 7736753 | 7/1978 | France . |
| 0124370 | 9/1979 | Japan ............... 55/487 |
| 915596 | 7/1991 | South Africa . |
| 925329 | 7/1992 | South Africa . |
| 652613 | 11/1985 | Switzerland . |
| 751713 | 7/1956 | United Kingdom . |
| 1220888 | 1/1971 | United Kingdom . |
| 1362375 | 8/1974 | United Kingdom . |
| 1575130 | 9/1980 | United Kingdom . |
| 2177013 | 1/1987 | United Kingdom . |

OTHER PUBLICATIONS

Patent Abstract of Japan, vol. 2, No. 66–May 19, 1978.
Patent Abstract of Japan, vol. 12, No. 191 (C–501) (3038)–Jun. 3, 1988.
Patent Abstract of Japan, vol. 11, No. 200 (C–431) (2647)–Jun. 27, 1987.
EPO Search Report dated Jul. 9, 1993.

*Primary Examiner*—Robert J. Warden
*Assistant Examiner*—Christopher Y. Kim
*Attorney, Agent, or Firm*—Harness, Dickey & Pierce

[57] ABSTRACT

A filter system 10 includes a pre-filter in a pre-filter zone 18 and a final filter in a final filter zone 22. The pre-filter is in the form of at least one inertial filter, e.g. an array 28 of axial flow cyclones 30. The final filter is in the form of a media filter 36 formed of a lofted bat of fibrous material which is of non-homogeneous structure through its depth. An upstream side is lofty, and a downstream side is of set structure. A contaminated fluid flow stream enters via an inlet 12. Contaminants are filtered out by the axial flow cyclones to be removed via a dust cover 32. Pre-filtered fluid flows via a chamber 20 through the media filter 36. After final filtration in the media filter it exits via a chamber 24 and an outlet 14.

10 Claims, 5 Drawing Sheets

FILTRATION

THIS INVENTION relates to filtration. It relates more specifically to a filter system.

The Inventors believe that this invention will find particular application in the field of filtering ambient air prior to induction as combustion air into an internal combustion engine such as an automotive engine, an industrial engine (for example a gas turbine) and the like. This invention is, however, also applicable to other fields, such as ventilation.

In accordance with the invention, broadly, there is provided a filter system comprising a pre-filter in the form of an inertial filter and a final filter in the form of a media filter comprising a filter element of fibrous material having a depth and being of non-homogeneous structure through its depth, a first depth portion, at a first side of the filter which will be an upstream side in use, being lofty, a second depth portion, at a second side of the filter which will be a downstream side in use, being of set structure.

"Inertial filter" is to be interpreted as a device in which filtration is effected dynamically by generating rotational flow in a flowstream to be filtered, allowing flow components having a relatively high density (i.e. contaminants in the form of particles) to concentrate toward a larger radius on account of centrifugal force generated by the rotational component of flow and separating said particles at the larger radius from other flow components of the flow which are at a smaller radius. It is a characteristic of an inertial filter that, generally, those flow elements of higher density (i.e. contaminants in the form of particles) which are separated from the rest of the flowstream are in the form of relatively large particles and that those particles which remain in the flowstream are of a relatively narrow size distribution and a relatively small median size. The degree of these tendencies correlate positively with filter efficiency of the inertial filter. The significance of this will become apparent hereinafter.

In a preferred embodiment, the inertial filter may be in the form of at least one axial flow cyclone or vortex tube, or an array of axial flow cyclones or vortex tubes in accordance with the description of any one of U.S. Pat. Nos. 4,985,058; 4,971,603; and 4,976,748 all in the name of Cyclofil (Proprietary) Limited. The disclosures of said United States patent specifications referred to above are herein incorporated by way of reference.

With reference to the filter element of the final filter, "lofty" is to be interpreted as having fibres which, generally, are unattached to other fibres, i.e "free", along major portions of their lengths, which free portions are flexible and are at least slightly resilient i.e. having a "memory" or having the tendency to return to a relaxed condition after having been deformed. In contrast, "set structure" is to be interpreted as having fibres which, generally, are relatively rigid. Such fibres may be attached to other fibres (i.e. "fused"), at least intermittently, along major portions of their lengths.

The filter element of the final filter may change progressively in structure from the upstream to the downstream side.

The filter element may be a composite filter element comprising a relatively thick overlay or capacity layer toward the first side and a relatively thin polishing layer or efficient layer toward the second side. The thick overlay or capacity layer, in combination with the thin polishing layer or efficient layer will then have the characteristics ascribed above to the filter element.

Instead, the filter element may be in the form of a relatively thick overlay or capacity layer which forms part of a composite filter element which comprises, in addition, a relatively thin polishing layer or efficient layer, the thick overlay or capacity layer then having the characteristics ascribed above to the filter element, and being arranged to be at an upstream side in use, the thin polishing layer or efficient layer being arranged to be at a downstream side in use. The polishing layer may then be in the form of a bat of set, fibrous material.

The first depth portion of the final filter may be formed of material selected to contain one of natural fibres, fibres of synthetic plastics material, a combination of natural fibres and fibres of a synthetic plastics material. The fibres have a Denier rating of less than 10, preferably less than 5. The significance of using thin fibre will become apparent hereinafter.

The second depth portion may include suitably settable fibres to allow the filter element to be formed of the lofted bat of fibrous material by the application of heat at the side of the second depth portion.

By way of development, the inertial filter and the media filter may be spatially separated and may be interconnected by means of ducting. Then the inertial filter may be accommodated in a pre-filter casing, and the media filter may be accommodated in a final filter casing.

BRIEF DESCRIPTION OF THE DRAWINGS

The invention is now described by way of non-limiting examples with reference to the accompanying diagrammatic drawings. In the drawings

With reference to FIG. 1 of the drawings, a filter system in accordance with the invention is generally indicated by reference numeral 10. The filter system 10, in this embodiment, comprises an inlet 12 for ambient air and an outlet 14 for filtered air. The filter system is accommodated in a casing generally indicated by reference numeral 16 which casing mounts the inlet 12 and the outlet 14. The casing 16 comprises a base 25 and a lid 26 which fits onto and is secured to the base 25 as shown at 66.

Figure 1:
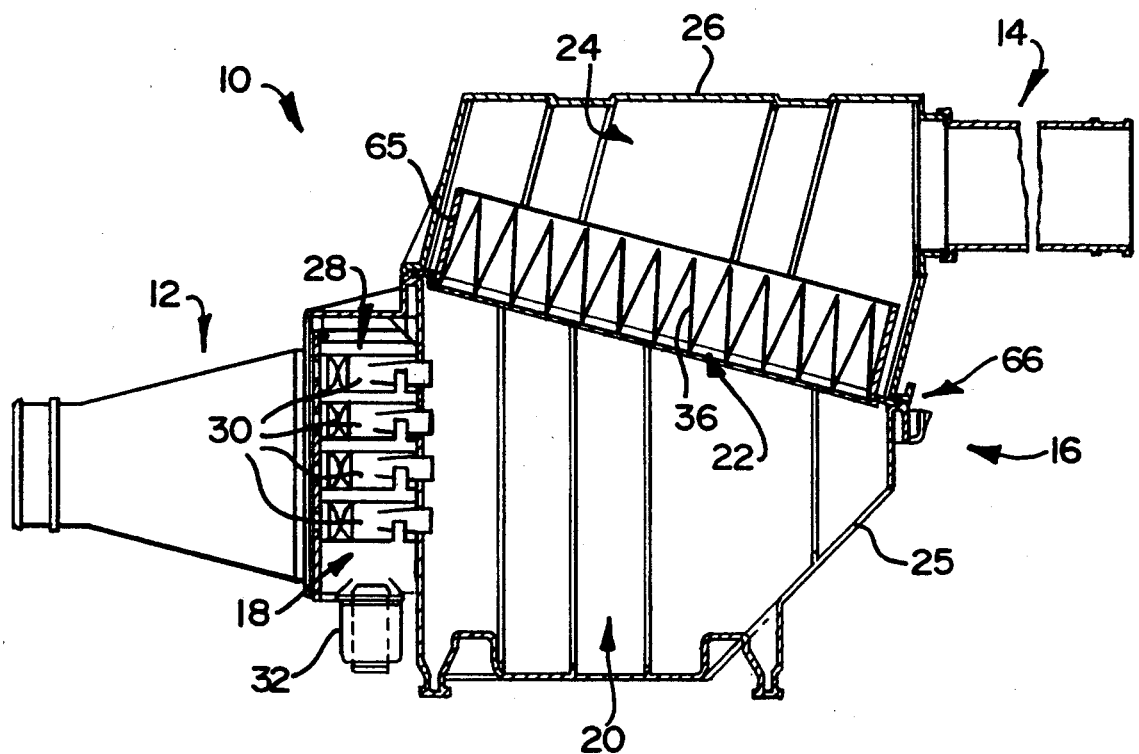
FIG. 1 shows, in section, a first embodiment of a filter system in accordance with the invention.

The casing 16 defines a pre-filter zone 18, an intermediate chamber 20, a final filter zone 22 and an exhaust chamber 24, all arranged in series.

In the pre-filter zone 18, there is provided an array 28 of axial flow cyclones or vortex tubes 30, which will be described in more detail with reference to FIGS. 3 and 2.

The vortex tubes 30 have inlets in communication with the inlet 12 which is in the form of an aerodynamic diffuser. Air to be filtered flows into the vortex tubes where relatively heavy contaminants are removed from the air flow stream.

The array of vortex tubes has a contaminant reservoir for the accumulation of the isolated contaminants in particulate form, such as dust, provided by a removable dust bowl 22. The vortex tubes 30, in the FIG. 1 embodiment, are operated with no scavenge air flow stream. This allows a solid (i.e. non-foraminous) dust bowl 32 to be used which is cleaned periodically. In other embodiments, e.g. the embodiment of FIG. 6, provision is made for a scavenge flow stream of, say, about 10%.

The vortex tubes 30 have outlets leading into the intermediate chamber 20 to conduct the pre-filtered air flow stream into the chamber 20.

The pre-filtered air is conducted from the intermediate chamber 20 into the final filter zone 22, in which there is provided a final media filter 36. The media filter 36 is peripherally contained in a frame 65 which is mounted between the base 25 and the lid 26. The construction of the media filter 36 can best be perceived from FIG. 4.

Figure 3:
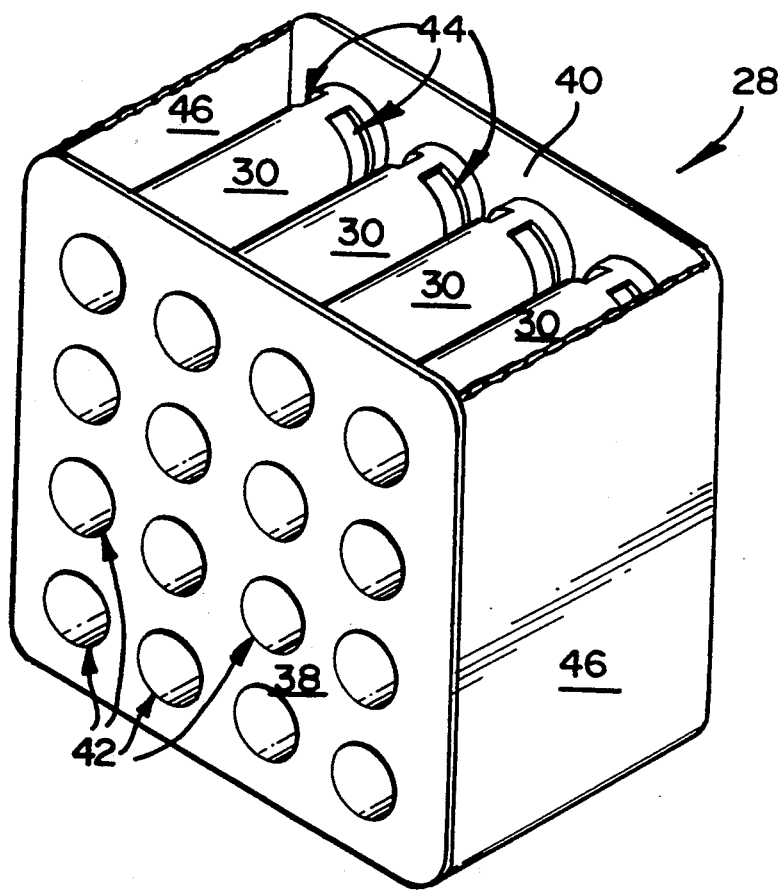
FIG. 3 shows, in three dimensional view, an array of axial flow cyclones or vortex tubes such as the cyclone or vortex tube of FIG. 2, the array forming part of the filter system of FIG. 1.

FIG. 3 illustrates the array 28 of vortex tubes 30. A plurality of vortex tubes 30 are arranged in parallel in matrix format. Each vortex tube 30 is located between a front plate 38 and a back plate 40 which are parallel and are spaced. Location is such that inlets 42 of the vortex tubes 30 are flush with apertures provided for that purpose in the front plate 38. Similarly, outlets of the vortex tubes 30 are flush with the back plate 40 and are in communication with the chamber 20 via apertures provided for that purpose in the back plate 40. Contaminant exhaust ports 44 of the vortex tubes 30 are communicated with a volume intermediate the front plate 38 and the back plate 40 which volume, at a low level, communicates with the dust bowl 32 shown in FIG. 1.

To contain the contaminants, side walls 46 extend intermediate the front plate 38 and the back plate 40, and a top, not shown in FIG. 3, is provided above the volume intermediate the front plate 38 and back plate 40. The dust bowl 32 covers the volume from underneath.

Figure 2:
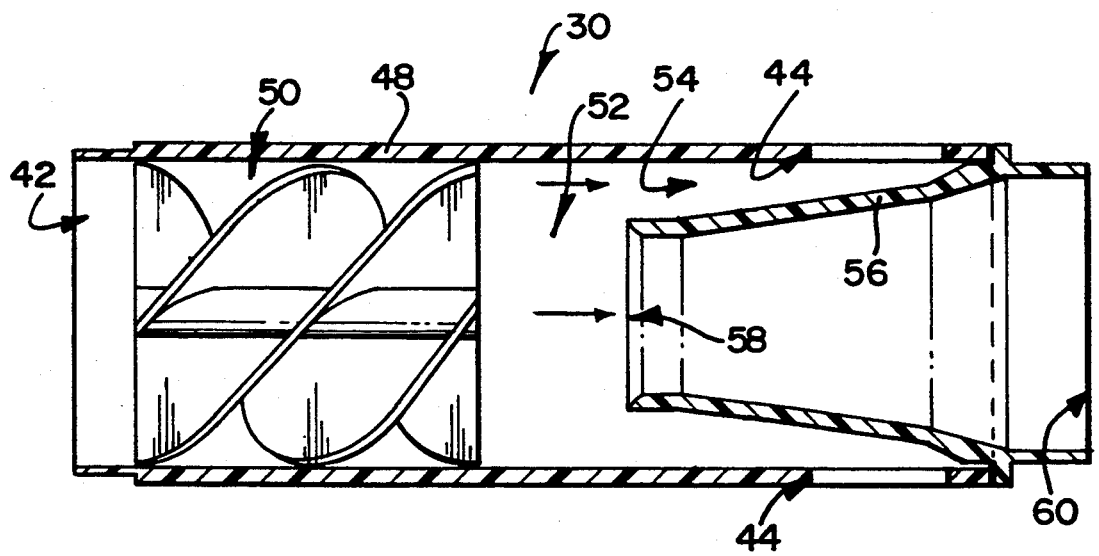
FIG. 2 shows, to a larger scale, in axial section, a single axial flow cyclone or vortex tube forming part of the filter system of FIG. 1.

FIG. 2 illustrates a vortex tube 30 in more detail. It comprises an outer tube 48, which in the embodiment of FIG. 2, is cylindrical and defines, at one end thereof, the inlet 42.

At an opposed end of the outer tube 48, it has an internal extraction tube 56 defining, at its outer end, an outlet 60 which is located in the back plate 40 as shown in FIG. 3. The internal extraction tube 56 tapers inwardly and has an internal mouth piece 58 of a diameter smaller than and concentric with the inner diameter of the outer tube 48.

Inwardly of the inlet 42, there is provided a vortex generator 50 which, in use, generates rotational flow. On account of the rotational flow, flow components are subjected to centrifugal force. Flow components of relatively high density, generally in the form of particles, concentrate toward the outer periphery of the outer tube. This separating mechanism is continued in a separation region 52 downstream of the vortex generator 50 and upstream of the mouthpiece 58.

Annularly outward of the inner extraction tube 56, there is defined an outer peripheral region 54 which terminates in the contaminant exhaust 44 which is shown in FIG. 3, and through which the contaminants are exhausted. It is to be appreciated that, specifically in this embodiment, the volume within the array 28 is a closed volume and that no net air flow takes place through the outer peripheral region 54, as was described above.

The central portion of the air flow, which is depleted of particles, especially particles of higher density, flows via the mouthpiece 58 and the inner extraction tube 56 through the outlet 60. With reference to FIG. 1, such prefiltered air flows into the intermediate chamber 20. The contaminants which accumulate in the dust bowl 32 are removed periodically.

It is important to appreciate that vortex tubes 30 in accordance with the United States patents referred to above have high efficiencies, typically in excess of 90% by mass with Standard AC Coarse test dust. Thus, more than 90% by mass of typical contaminants in the air are filtered out in the pre-filtering zone 18 and less than 10% by mass of the typical contaminants are contained in the air in the intermediate chamber 20.

Figure 7:
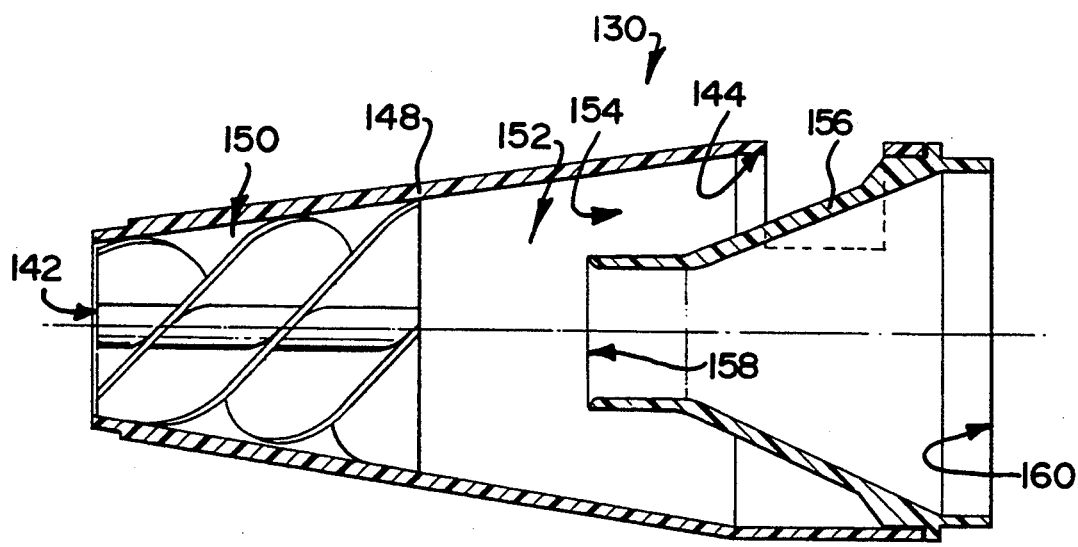
FIGS. 7 and 8, show, in views corresponding to FIG. 2, further embodiments of cyclones or vortex tubes.

With reference to FIG. 7, another embodiment of an axial flow cyclone or vortex tube is indicated by reference numeral 130. The vortex tube 130 is similar in many respects to the vortex tube 30 of FIG. 2 and like reference numerals refer to like features. The vortex tube 130 is not described in detail and emphasis will merely be placed on a single important difference.

The vortex tube 130 has a frusto-conical outer tube 148. For reasons fully described in U.S. Pat. No. 4,971,603, the vortex tube of FIG. 7 is well suited for use under conditions of no net outflow through the contaminant exhaust 144.

Figure 8:
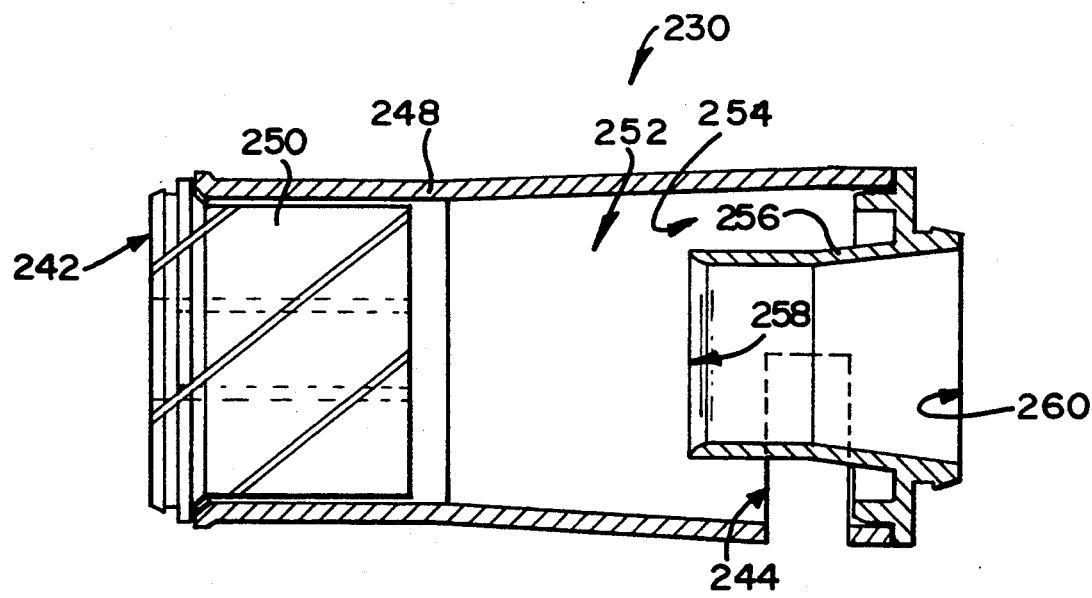

With reference to FIG. 8, yet a further embodiment of an axial flow cyclone or vortex tube is indicated by reference numeral 230. The vortex tube 230 is similar in many respects to the vortex tubes 30 and 130 and is not described in detail. Like reference numerals refer to like components or features.

The vortex tube 230 has an outer tube 248 which is parallel in the vortex generating region, and which flares or diverges in the separation region 252. It is a compromise between the embodiments of FIGS. 2 and 7, having most of the advantages relating to packing density of the FIG. 2 embodiment and retaining, partially, the advantage of the FIG. 7 embodiment in respect of operation with no scavenge flow.

Figure 4:
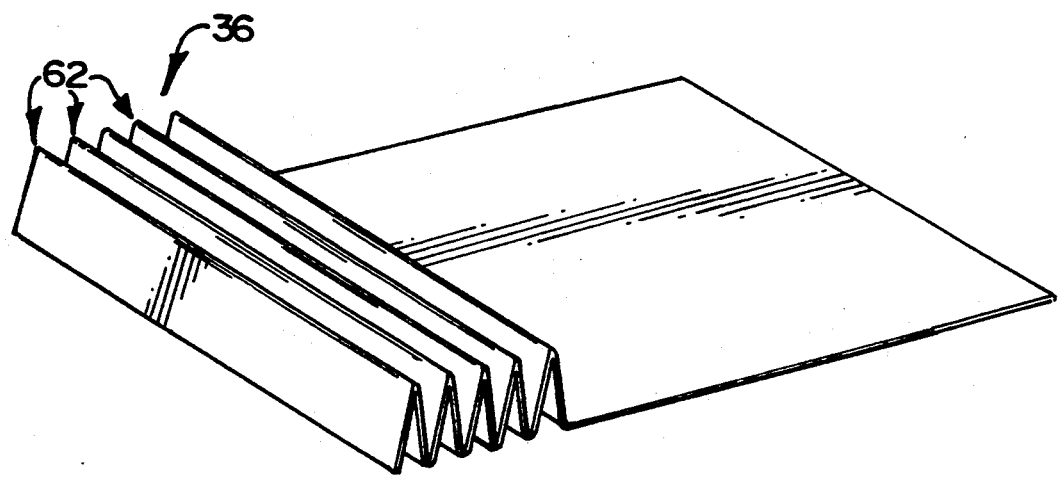
FIG. 4 shows, to a larger scale, in three dimensional view, a partially formed media filter which will form part of the filter system of FIG. 1.

With reference to FIG. 4, the media filter 36, specifically in this embodiment, is of generally rectangular shape and has parallel concertina formations 62 formed by folding, to enhance its rigidity, but mainly to increase the available filter area. It is peripherally contained in the frame 65 shown in FIG. 1 by means of which it is mounted between the base 25 and the lid 26. In other embodiments, the media filter may be of virtually any desired shape or configuration, e.g. polygonal, cylindrical, conical, and the like. It is however to be appreciated, as will become clearer from the description of FIG. 5, that the media filter has considerable thickness or depth and that the filter material should, generally be folded and not stretched during forming.

Figure 5:
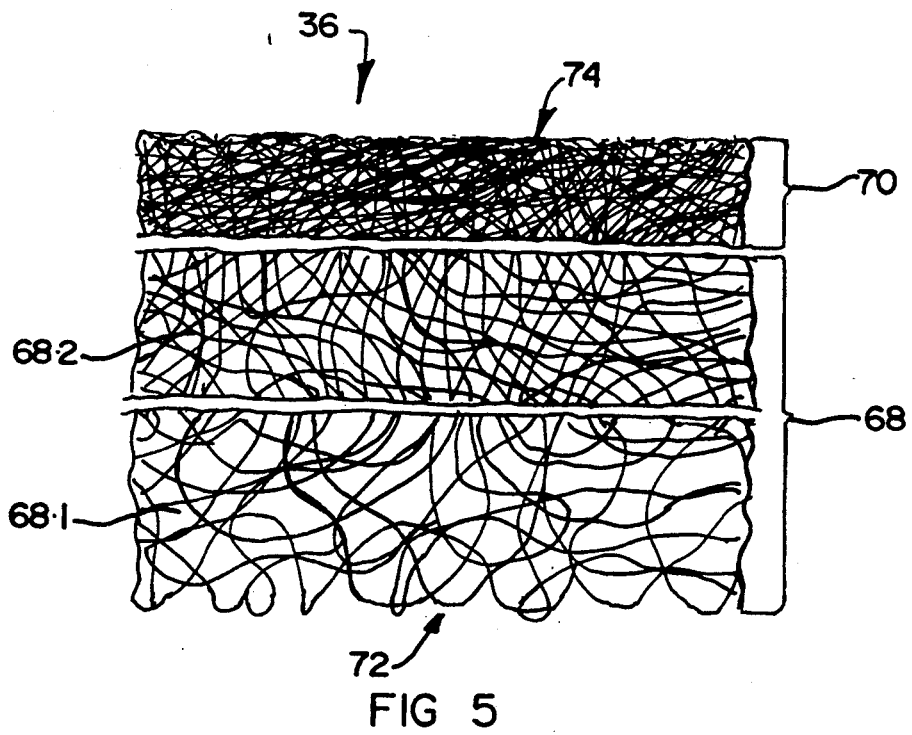
FIG. 5 shows, to a much enlarged scale, fragmentarily, a cross section through the material of the media filter of FIG. 4.

With reference to FIG. 5, the media filter 36, in this embodiment, is of composite construction formed, as will be described herebelow, of an overlay or capacity layer 68 which is also referred to as a face layer, and a polishing or efficient layer 70 which is also referred to as a back layer. Forming of the material of the media filter 36 is described below. During such forming, the two layers are integrated such that the filter material is perceived by a casual observer as a single layer which is of non-homogeneous structure.

At a first side 72, which will be an upstream side in use, the fibres are lofty. The fibres, however, become increasingly less lofty and become more densely arranged as the depth from the first side 72 increases. Thus the very lofty structure shown at 68.1 at the first side 72, gradually goes over to the less lofty and more dense structure as shown at 68.2 remote from the first side 72.

At a second side 74, which will be a downstream side in use, the fibres are set, or fused and set. This is effected by the application of heat at the second side 74 during forming of the filter element 36.

The material of the capacity layer 68 and efficient layer 70 and the construction of the filter element 36 are now described in more detail with reference to the following working example.

Working Example:

The filter element is formed of two layers which are conveniently respectively referred to as the face layer and the back layer and which correspond respectively to the capacity layer 68 and the efficient layer 70.

The face layer is formed of 100% polyester staple fibre having a thickness rating of about 3 Denier and a staple length of about 50 mm.

The back layer is formed of a combination of polyester staple fibre of 3 Denier and 50 mm length, polyester staple fibre of 1.5 Denier and about 40 mm length and a bi-component low melt staple fibre of 4 Denier and about 50 mm length. The relative percentages of the components and fibres of the back layer will determine the performance of the efficient layer and will be selected bearing the desired characteristics in mind. By way of explanation, it is mentioned that the bi-component low melt staple fibre has a core of polyester of a "standard" melting temperature of about 260°, and a sheath of a co-polyester polymer of low melting temperature of about 110° C. to 200° C. The co-polyester-polymer has a high affinity for standard polyester and is thus able to bond the fibres of the other components by means of heat.

The fibres of the face layer and of the back layer blend are separately carded into webs of predetermined mass. In order to obtain in both the face and the back a web of consistent mass per unit area, the webs from the carding machine are left in several layers on a cross folder or cross lapper. The webs are then individually reinforced by a pre-needled punching process where the fibres of the webs are loosely intertwined. This process imparts to the web a relative stability which enables the web to be handled with little distortion. The needling density after this operation is only about 10 punches per square centimeter.

The face layer is then assembled to the back layer by a double needle punching operation having a needle density of about 70 punches per square centimeter. At this stage, the relative positions of the fibres to one another is already determined, however, the structure is still loose with low density and large voids.

The filter element is then formed during a complex heat moulding process, in two stages in which, respectively, the media are passed through a heated oven having an air temperature sufficient to melt the sheath of the bi-component fibre. The dwell time during the passage of the media is about one minute. This effects heat bonding of the media where the bonds between fibres are formed by melting the sheath of the bi-component fibres present in the back layer. In this manner, the rigidity and stability of the media are improved and cell-like structures are created in the back layer. It is to be appreciated that such heat bonding takes place predominantly in the back layer, as the fibre temperature is high enough only to melt the sheaths of the bi-component fibres which are present only in the back layer.

In a second stage, the media are heated in moulds or between heated plates or heated rollers. During this stage, the pore size is decreased by compressing the media and therefore bringing the fibres closer to one another. The cells formed during the heat bonding process are compressed and reformed under heat conditions without affecting the bond between the fibres. This results in a smaller cell area due to the compression of the media. Once cooled, the thickness and therefore the cell size stabilizes into its new dimension. Thus, at the second side 74, a relatively smooth and highly porous surface is formed. At the first side 72, the structure remains lofty. As mentioned above; with reference to FIG. 5, the density of the face layer increases and the void size, correspondingly, decreases with increased depth from the side 72.

Because of the low pressure required and relatively low heat required during the heat moulding of the media, generally no "blinded" cells are formed during the finishing process of the media which imparts to the media the potential for a high flow rate, a high number of pores and a relatively homogeneous pore size. In relation to other filter media this construction provides the opportunity to create media into which any required filtration characteristics can be imparted during the process of heat forming the media into any required shape or configuration. The relative construction or fibre combinations in the back layer provide the versatility in respect of formability or mouldability and versatility in respect of efficiency characteristics.

With reference again to FIG. 1, the pre-filtered air in the intermediate chamber 20 then flows through the filter element 36 where final filtering takes place, accumulates in the exhaust chamber 24 and flows out through the outlet 14.

It is important to appreciate that the media filter 36 has a dual function. The first side 72 and the filter material adjacent thereto, which is lofty and of relatively large depth dimension, allow dust particles to penetrate relatively deeply into the filter material. Thus, it has little tendency for a cake to form on the surface and thus to blind the filter. This greatly increases the dust capacity. Furthermore, because the fibres are relatively thin and because they are free along major portions of their lengths, they have good adsorption characteristics to adsorb dust, also very small dust particles.

The polishing layer 70 has a relatively large pore size—of the order of 90 micron—and the pores are relatively homogenous in size. This combination allows a high efficiency to be obtained without forfeiting advantageous pressure drop characteristics.

During initial tests, it was found that the filtering efficiency of the pre-filter is of the order of 90% by mass with Standard AC Coarse test dust. The contaminants allowed through the filter are tentatively expected to have a median size of about 2 to 3 micron. The pressure drop, which remains constant for the life of the pre-filter is of the order of 0.5 kPa.

The media filter 36 has an efficiency such that, in combination with the pre-filter, the efficiency of the filter system is at least 99.9% by mass with Standard AC Coarse test dust. Where the efficient layer 70 is used, it is expected that the contaminants allowed through would have a median size of typically smaller than 1 micron. The media filter 36, initially, has a pressure drop of about 0.5 kPa and, at the end of the test, a pressure drop of about 4.5 kPa (bearing in mind the constant pressure drop of about 0.5 kPa over the pre-filter, and the convention in dust capacity tests of terminating the test when the total pressure drop has reached 5 kPa). The specific dust capacity, i.e. the amount of dust which can be filtered per unit area of the filter element, of such a filter system in accordance with the invention is expected to be an order of magnitude larger (say between about 5 times and about 50 times larger) than the specific dust capacity of a typical cellulosic or paper filter currently generally in use with automotive engines.

Test results, obtained with SAE Standard Coarse Dust in test procedures complying with BS 1701; ISO 5011; SAE J726 and DIN 24189, and with a filter system utilizing an inertial filter of the type of FIG. 7 and a media filter in accordance with the Working Example described herein, were as follows:

Efficiency $\geq 99.9\%$.
Initial Pressure Drop $< 1.3$ kPa.
Specific Dust Capacity $> 8000$ gm/m$^2$.
The specific Dust Capacity was calculated on the filter area of the media filter.

Figure 6:
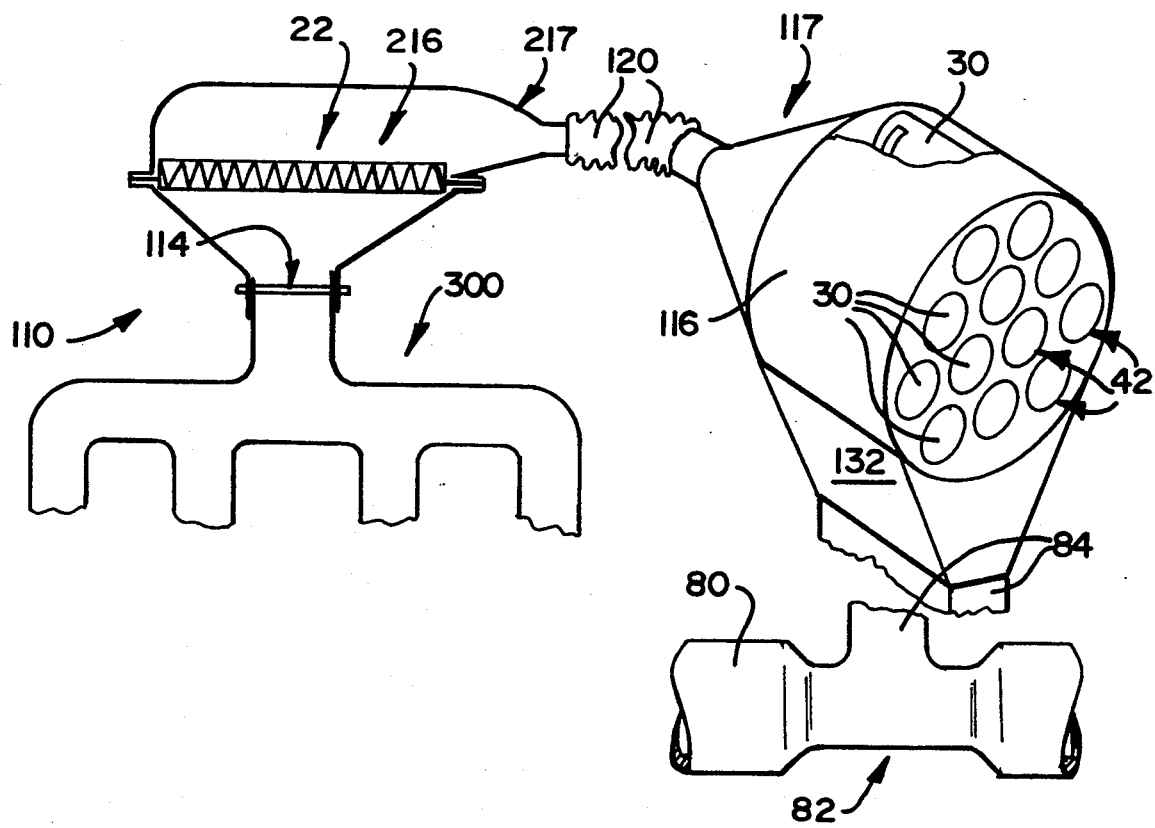
FIG. 6 shows, diagrammatically, another embodiment of a filter system in accordance with the invention.

With reference to FIG. 6 of the drawings, another embodiment of a filter system in accordance with the invention is generally indicated by reference numeral 110. This embodiment, in many respects, is similar to the embodiment of FIG. 1 and like reference numerals refer to like features or components. Thus, the filter system 110 is not again described in detail, but emphasis will merely be placed on two important differences.

The first advantage is that, in the embodiment of FIG. 6, the pre-filter and the final filter are physically separated and are contained respectively in a pre-filter housing 116 and in a final filter housing 217. An outlet 117 of the pre-filter housing 116 is communicated by means of a conduit, which in this embodiment is a flexible conduit 120, with an inlet of the final filter housing. The final filter housing is directly mounted as indicated by reference numeral 114 onto an inlet manifold 300. Operation of the filter system 110 is similar to that of the filter system 10.

It is a specific advantage of the type of filter system of FIG. 6 that it adds versatility and enhances the potential for utilizing a filter system in accordance with the invention in potentially difficult applications i.e. where the space available for a filter system is limited. For example, in such a case, the pre-filter can be positioned at a convenient location remote from the final filter which is conveniently proximate the inlet manifold. This advantage must be seen against the background that, in accordance with practical experience with filter systems in accordance with this invention, such a filter system can be designed and constructed to be as compact—under specific circumstances even more compact—than conventional paper filters.

The inertial filter in a filter system in accordance with the invention may be required to operate under circumstances, for example where exceptionally high dust loads are experienced, under which it would be advantageous to have a finite scavenge flow through the contaminant exhaust 44, 144, 244. Then, advantageously, the contaminant exhaust may be communicated with an outlet through which a scavenge flowstream highly concentrated in contaminants may be exhausted. Advantageously, in the case of an internal combustion engine, such scavenge flowstream may be inducted into an exhaust 80 of the internal combustion engine. A venturi, or venturi-like arrangement 82, may be utilized in this regard. A throat portion of the venturi-like arrangement 82 is communicated by means of a communication duct 84 with a dust bowl 132 provided at a bottom of the housing 116. Such an arrangement may have advantageous pressure characteristics which may enhance operation of the vortex tube. Generally, if a scavenge flowstream is used, it may be of an order of magnitude of about 10% of the inlet flowstream.

Figure 9:
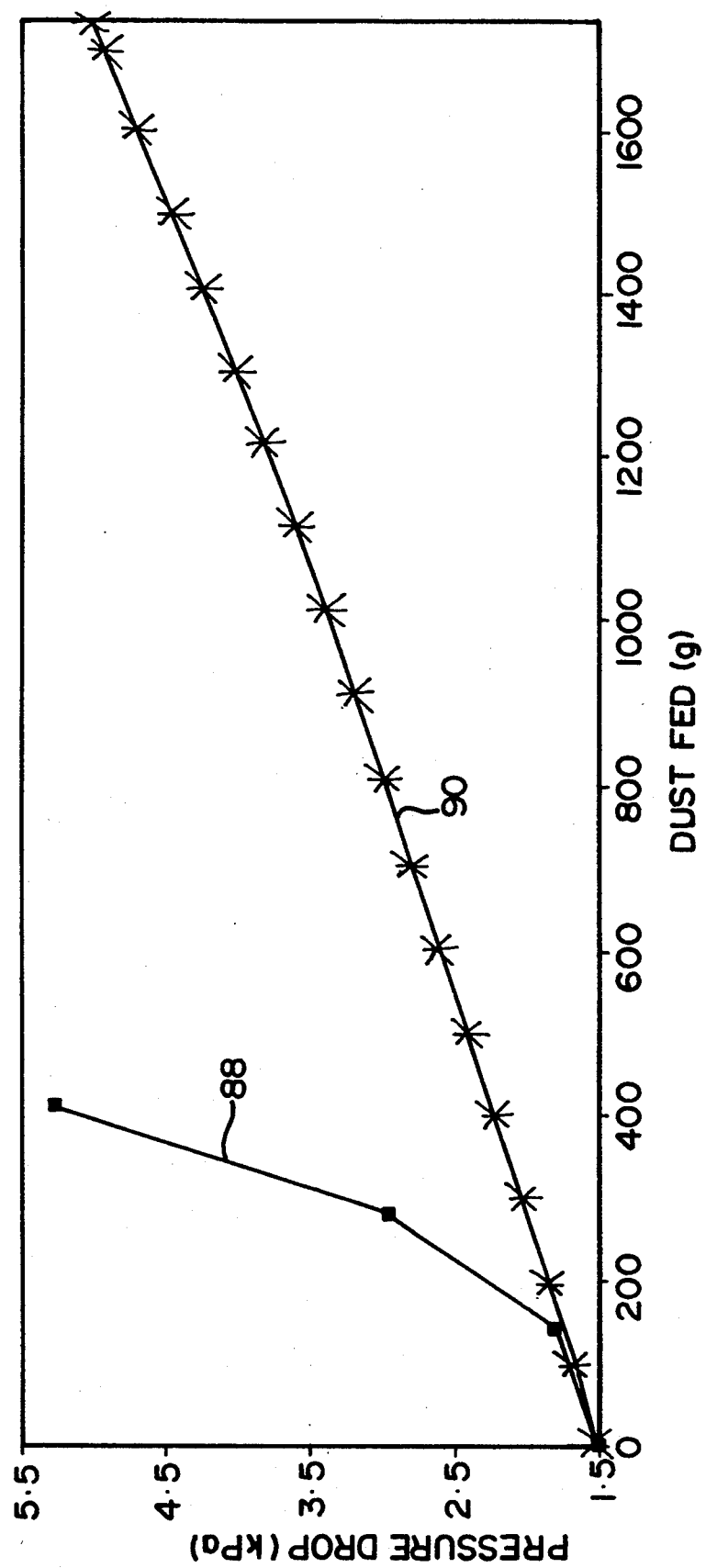
FIG. 9 shows, graphically, performance of an automotive filter system in accordance with the invention, in comparison to a typical conventional cellulosic filter.

With reference to FIG. 9, the actual, measured performance of an existing, conventional, automotive filter is graphically illustrated by means of a plot 88 of pressure drop against total mass in gram of AC Coarse test dust retained on the filter. It can be seen that the dust capacity of the filter is about 400 gram at a pressure drop of about 5 kPa. The comparative, actuality measured, performance of a filter system in accordance with the invention and which replaces the conventional filter, is plotted at 90. The dust capacity is in excess of 1600 gram, i.e. of the order of four times that of the conventional filter.

The dust capacity is directly related to the service life. Thus, in the example tested, the filter system in accordance with the invention has a useful service life nominally four times that of the existing filter which it replaced.

The Inventors regard it as very important that they appreciated that conventional cellulosic filters currently generally in use in automotive engines are inherently ill-suited for use as a final filter in a composite filter system of the general kind to which this invention relates. They have also identified the nature of the inherent problem. They have realized that conventional cellulosic filters require build-up of a cake on the media filter surface (also referred to as "conditioning") to enhance the efficiency of filtering. Such a cake is ideally formed of particles of a wide size distribution. They have also realised that that very requirement for the cake build-up has inherent disadvantages.

First, it limits the specific dust capacity of the filter. Thus, conventional filters, under arduous conditions, require regular maintenance or replacement to prevent the pressure drop from becoming unacceptably high.

Second, the requirement for cake build-up to enhance the filtering efficiency in the case of conventional media filters necessarily implies that the initial filtering efficiency, until the cake has built up, is not optimal. In a filter system of the general kind to which this invention relates, the pre-filtered air entering the final filter stage, in comparison to the air prior to pre-filtering, has a lower dust load and the particle distribution is narrower with a smaller median size. Thus, with a conventional filter as a final filter, compared to its operation with air which has not been pre-filtered, the build-up of such a cake is retarded. The filtering efficiency, before the build-up of the cake has been effected, is less than optimal. This is aggravated by the phenomenon of "over servicing" which happens when the media filter is serviced or replaced prematurely. "Over servicing" has the effect that less than optimum filtering takes place for a larger percentage of time, thus reducing the average filtering efficiency.

Third, if conditioning takes place with a dust load of narrow size distribution, "blinding" of the filter takes place. This causes rapid increase in the pressure drop over the filter. Such rapid increase in pressure drop curtails the useful service life of a conditioned filter.

The above disadvantages must be seen against an inherent characteristic of inertial filters referred to above, namely that narrowness of particle size distribution and smallness of median size correlate positively with an increase in efficiency of an inertial filter. Bearing in mind that narrowness of particle size distribution, especially, is the basic reason for the disadvantages mentioned above, it becomes apparent that the use of an inertial pre-filter in combination with a conventional media filter is, at least to a degree, self-defeating, and, furthermore, that an increase in efficiency of the pre-filter may actually aggravate the situation.

Thus, the Inventors appreciated that another type of media filter is required to filter pre-filtered air, they identified the specific problem with conventional filters, and they devised the principles underlying the current invention. The type of media filter as herein defined was accordingly developed.

It is thus an important advantage of the media filter herein defined that substantial penetration of contaminant into the material of the media filter takes place which enhances its specific dust capacity. This desired characteristic is achieved by having the upstream or first depth portion of the media filter of lofty structure. Furthermore, the fibres of which the media filter is formed are thin thus having good adsorption characteristics in respect of small particles. Finally, the media filter in accordance with the invention has an efficient layer to ensure that the media filter has a high efficiency, in combination with a low pressure drop on account of the relatively large pore size (typically 90 micron) and the homogeneity of the pores.

Photographs, by means of an electron microscope, of samples, taken at different depths, of the media filter, clearly show that large particles are captured at the upstream side of the media filter, and, progressively, smaller particles are captured toward the downstream side. These clearly show the principle of depth filtration, as opposed to filtration by means of a cake on the upstream surface of a conventional filter.

Thus, the media filter of this invention has, in combination, and under circumstances of a flow stream having a low dust load of particles of narrow size distribution and small median size, a high specific dust capacity and a high efficiency, respectively ensured by the provision of a lofty first depth portion and a set final depth portion. These characteristics, furthermore, enable the media filter to operate well in combination with even a highly efficient inertial pre-filter, thus enabling the filter system to benefit from the advantages of such a highly efficient inertial pre-filter. Furthermore, the media filter does not require conditioning (build-up of a cake). Thus it is not prone to the disadvantage of relatively inefficient filtration initially. "Over servicing" is thus also not a problem as far as efficiency is concerned.

It is an important advantage that a final filter is provided having the specific characteristics as described above. The provision of such a final filter now allows a composite filter system of the general kind to which this invention relates to be operated efficiently, i.e. to enjoy the advantages offered by the pre-filtering facility, without introducing the disadvantages or shortcomings of conventional media filters when used as a final filter. Thus, the invention allows the general advantage that a large percentage of contaminant is removed in an inertial filter which has a low, and constant pressure drop and thus an unlimited "dust capacity", to be obtained while maintaining efficient final filtering.

We claim:

1. A filter apparatus including
   pre-filter means which comprises at least one axial flow vortex tube including
   a straight round outer tube having an inlet end and an opposed end at a downstream end,
   an axially arranged vortex generator downstream of said inlet,
   a separation region downstream of the vortex generator,
   an annular outlet region toward a periphery of the outer tube downstream of the separation region,
   a central outlet region in the center of the outer tube downstream of the separation region,
   an inner round extraction tube which is arranged concentrically in the outer tube such as to separate the annular outlet region and the central outlet region, the extraction tube having an inlet end at a predetermined axial position corresponding to a downstream end of the separation region, and an outlet end at a predetermined axial position, said inlet end of the inner round extraction tube cooperating with the outer tube to define an annular inlet for the annular outlet region, and
   a contaminant exhaust outlet for the annular outlet region downstream of said annular inlet for the annular outlet region;
   final filter means including a media filter element of fibrous material, the media filter element
   having a first side defining an upstream side and a second side defining a downstream side,
   having a depth corresponding to a spacing between said first side and said second side,
   being of non-homogenous structure through said depth,
   having a first depth portion extending from said first side only partially toward said second side, the first depth portion having a structure including fibers which are free from another fiber along major portions of lengths wherein free portions of the fiber are flexible and are resilient such as return to the original condition after having been deformed,
   having a second depth portion adjacent and in series with said first depth portion toward the second side, the second depth portion having a structure including fibers attached to other fibers at least intermittently via material of the fibres under the influence of heat.

2. A filter apparatus as claimed in claim 1, wherein the first depth portion is a capacity layer and the second depth portion is a first efficient layer, the capacity layer being thicker than the first efficient layer.

3. A filter apparatus as claimed in claim 1, wherein the outer tube of the axial flow vortex tube diverges in a downstream direction at least through the separation region, wherein the axial flow vortex tube operates with no gas flow through the annular outlet region, and wherein the filter apparatus includes a dust bowl which is closed, which is communicated with the contaminant exhaust to receive contaminant particles, and which can selectively be opened to allow cleaning.

4. A filter apparatus as claimed in claim 1, wherein the outer tube of the axial flow vortex tube is cylindrical at least from the outer tube inlet to about the downstream end of the separation region, in which the axial flow vortex tube operates with a scavenge gas flow stream through the annular outlet region, and said filter apparatus includes a flow device having an inlet and an outlet to the flow device incorporated in series in ducting, and a throat of reduced flow area intermediate the inlet and the outlet, and connection means for connecting the throat to the contaminant exhaust outlet.

5. A filter apparatus as claimed in claim 2, further including adjacent and downstream of the second depth portion, at the second side, a second efficient layer formed by a bat of set fibrous material, said second efficient layer being thinner than the first efficient layer.

6. A filter apparatus as claimed in claim 5, wherein the bat of set fibrous material includes fibers of bi-component low melt staple fiber having a core of a material having a melting temperature and a sheath of a material having a melting temperature lower than the melting temperature of the material of the core, the sheaths of the fibers respectively being partially molten and attached intermittently along their lengths at intersections with other fibers to said other fibers.

7. A filter apparatus as claimed in claim 6 wherein the bat of set fibrous material further includes, fibers of mono-filament construction of material having a melting temperature higher than the melting temperature of the material of said sheaths.

8. A filter apparatus as claimed in claim 7, wherein said fibers of mono-filament construction has a thickness rating smaller than a thickness rating of said fibers of mono-filament construction.

9. A filter apparatus as claimed in claim 7, wherein said fibers of mono-filament construction are of polyester and said cores are of polyester and said sheaths are of co-polyester polymer.

10. A filter apparatus as claimed in claim 9, wherein the melting temperature of said cores is about 260° C. and the melting temperature of said sheaths is between about 110° C. and about 200° C.

* * * * *